United States Patent Office 3,410,731
Patented Nov. 12, 1968

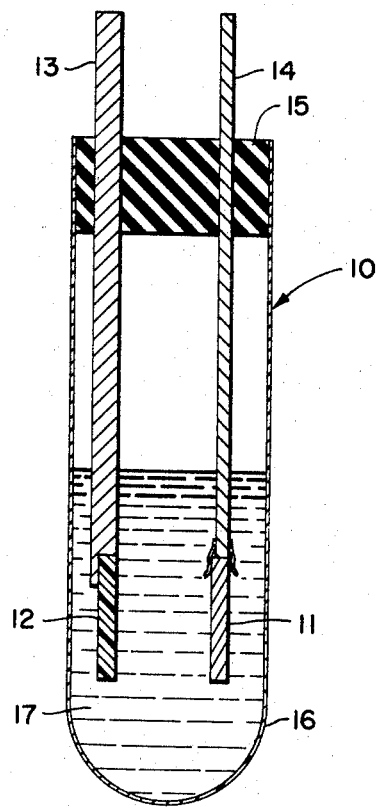
INVENTOR
ROBERT A. RIGHTMIRE
EDWARD S. BUZZELLI

3,410,731
TUNGSTEN OXIDE-CONTAINING
COMPOSITE ELECTRODE
Robert A. Rightmire, Twinsburg, and Edward S. Buzzelli, Cleveland, Ohio, assignors to The Standard Oil Company, Cleveland, Ohio, a corporation of Ohio
Filed Jan. 3, 1966, Ser. No. 518,112
6 Claims. (Cl. 136—100)

ABSTRACT OF THE DISCLOSURE

There is provided an improved electrical energy storage device of the fused salt electrolyte type characterized by an electrode comprising tungsten oxide.

---

This invention relates to electrodes for an electrical energy storage device, and more particularly, to certain tungsten oxide-containing composite electrodes to be used in an electrical energy storage device.

Electrical energy storage devices conventionally include an electrolyte in contact with a pair of electrodes, one of which is negatively charged, while the other electrode is positively charged, the electrodes being charged negatively or positively with respect to each other. The desirability of these electrical energy storage devices is based on the characteristic of high electrical energy storage per unit of total electrical volume.

Thus, it will be appreciated that the electrical energy storage capability of the electrodes is a very important factor in the total energy storage of which the device as a whole is capable.

It has now been discovered, in accordance with the present invention, that the capability for energy storage of an electrical energy storage device can be greatly enhanced by use of at least one tungsten oxide-containing electrode, the tungsten oxide-containing electrode can comprise solely tungsten oxide and/or tungsten oxide compounds in combination with other electrically conductive material.

Tungsten oxide is a non-stoichiometric compond. The term "tungsten oxide-containing composite" is therefore used to mean any electrode containing tungsten oxide, the oxygen content of which oxide is less than about 15 weight percent. Higher oxides (higher weight percent of oxygen in the tungsten oxide) have proven to be soluble in the environment of some of the halide melts. In addition, the higher the oxygen content, the lower the energy storage capability of the electrode formed from the tungsten oxide.

Electrically conductive material can comprise, for example, carbon, graphite, boron carbide, silicon carbide, tungsten carbide, petroleum coke and conductive carbides, silicides, nitrides and oxides of metals, stable in the environment of the halide-containing electrolyte.

Also present as part of the composite electrode is any available binder, such as a carbonized phenolic resin or carbonized coal tar pitch.

Electrical energy storage devices comprising the tungsten oxide-containing composite cathode (positive electrode) have exhibited electrical capacities in excess of 500 amp-minute per cubic inch of electrode. This is far greater than those capacities measured using a carbon electrode in place of the tungsten oxide-containing composite electrode. If desired, both positive and negative electrodes can be tungsten oxide containing.

It has been found that the tungsten oxide-containing component of the electrode can vary, although not necessarily with equivalent results, from about 5 weight percent, based on total composition weight, to in excess of about 98 weight percent, based on total composition weight, the balance being electrically conductive matrial, as aforementioned. However, tungsten oxide concentrations of about 40–60 weight percent, based on total electrode composition, are favored in most electrode-electrolyte energy storage devices. The advantages of the tungsten oxide electrode can be observed at compositions lower than 5 weight percent, but the advantages are not considered substantial.

It has been found that electrodes comprising tungsten oxide in these amounts work as a reversible positive electrode with extremely high energy storage. The tungsten oxide-containing composite positive electrode of the invention gives about 250–500 percent greater energy storage capacity than an equivalent amount of a corresponding carbon electrode of a surface area of about 400 meters per sq. gram, a transverse strength of 1600 p.s.i., a resistance of 0.013 ohm/in.$^3$, and a tensile strength of about 700 lb./in.$^2$ (Pure Carbon Company, Purbon FC–13).

The particles of material, e.g. the tungsten oxide with or without other conductive material or binder, the tungsten oxide-containing particles of which are formed about 100–100,000 angstroms, comprising the composite electrode are mechanically blended together and mechanically pressed at a temperature of from about 50° C. to 500° C., or above the flow temperature of the binder, if used, and at a pressure of above about 1000 pounds per square inch. Higher pressures provide greater active electrode content per unit volume of electrode. The maximum pressure limit is determined by the desired porosity in the finished electrode.

After pressing, where binder is used, the electrodes are heated in an inert atmosphere at a temperature of from about 100° C.–1200° C. to cure and bake the binder. Inert gas (e.g. argon, helium and nitrogen) is used to control oxidation. After baking, in which considerable $CO_2$, steam and CO are evolved, and a composite mixture is formed, the electrodes are porous, strong and electrically conductive. Other methods of producing a tungsten oxide-containing mass, i.e. a tungsten oxide plate, are also contemplated.

Before an electrical energy storage device can be fabricated for market, the electrodes must be preconditioned, i.e. easily degradable components in the structure must be removed and the electrode must become permeated with electrolyte. Therefore, prior to commercial operation of the electrical storage energy device, the carbon containing electrode assemblies, including the tungsten oxide-containing composite electrode, are alternately charged positively and negatively. The preconditioning of the electrodes involves immersing the electrodes in a metal and halide ion-containing electrolyte and the electrodes are alternately charged to oxidize the tungsten oxide with halide ions and discharged to reduce the tungsten oxide.

Electrodes may also be preparing by hot pressing (sintering). Sintering is used herein to designate the state of the metal in which its particles begin to fused without any appreciable change of form, or at least start to be sticky, so that small particles begin to stick together on edges or surfaces contacting one another, and after cooling remain so. In general, the temperature of sintering is such that the particles begin to coalesce, forming a coherent body with vacancies or voids between the individual particles, the importance of which in the present invention is to be discussed hereinafter.

Any method of electrode fabrication which produces a porous material is satisfactory. The porosity (voids between particles) of the tungsten oxide-containing composite electrode should be from about 15 to 70 percent in the fully discharged or reduced state, the voids between composite particles being large enough to permit the electrolyte to enter freely the voids of the electrode and fill up the voids.

The electrode opposed to the tungsten oxide-containing composite electrode of the electrical energy storage device of this invention can be a porous carbon electrode conductor in the form of finely divided particulate material, e.g. a high surface area, activated carbon.

Active carbon is prepared in a two-step process comprising formation of a porous amorphous primary carbon at a relatively low temperature, followed by the removal of adsorbed hydrocarbons from the primary carbon. Step two involves the removal of adsorbed hydrocarbons by combined oxidation and distillation involving steam alone, or steam and air; the hydrocarbons of low boiling points are broken down into more volatile substances easily removed at low temperature and under conditions less likely to result in the deposition of secondary carbon, which is inactive. During the removal by oxidation and distillation of the hydrocarbons, a loss in primary carbon by oxidation occurs; the conditions of activation must therefore be chosen so that the hydrocarbons are oxidized rapidly while the primary carbons slowly.

In one method of operation of the steam-activation process, the carbon is placed in an upright steel tube with top feed and bottom discharge. Superheated steam enters and streams downward through the carbon, carrying away the undesired hydrocarbons before they can be decomposed by the high temperature and deposit inactive carbon. In air treatment the temperature is about 350° C.–450° C. while in the steam oxidation process, the temperature is about 800–1200° C. Other electrodes may also be used in place of the carbon, as for example, an electrode of nickel, zinc, alumium, magnesium and lithium and combinations thereof. Of these, an aluminum-lithium alloy electrode is preferred.

The aluminum-lithium electrode can be produced by combining lithium with the aluminum by preparing a preformed alloy of aluminum and lithium, or, alternatively, electrochemically by charging a substantially pure aluminum electrode in an electrolyte containing lithium ions to the extent of about one amp-hr. per gram of aluminum whereby lithium is diffused into the aluminum electrode structure.

The aluminum-lithium alloy of the electrode comprises aluminum in amounts of from about 70–95 weight percent, based on total composition, and from about 5–30 weight percent, based on total composition, lithium. Impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode, which functions best in a lithium halide electrolyte, is capable of storing lithium metal of the electrolyte without forming an extensive liquid. Hence, the electrode remains solid, which solid electrode is capable of diffusing the lithium metal of the electrolyte through its structure. It has been found that on charge of the cell comprising the aluminum-lithium electrode, the electrode structure expands wherein lithium metal of the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

The electrode material is preconditioned by slow charge and discharge initially. This slow preconditioning results in an electrode of substantially high uniform aluminum-lithium distribution porosity and which electrode facilitates the takeup and release of the lithium metal upon the subsequent fast charge and discharge of a cell containing the electrode. If the initial charge and discharge cycles of the preconditioning are carried out too rapidly, local regions of liquid metal alloy are built-up, and the result is pitting of the aluminum-lithium electrode, which pitting has a deleterious effect when the electrodes are put into routine use. Evidence of such pitting is visually evident in the aluminum-lithium electrode as lithium agglomeration. Aluminum-lithium electrodes cycled by slow charge and discharge show a fine, even distribution of the lithium metal in the aluminum.

The electrolyte used in the device of this invention is a medium comprising a source of dissociated metal and halide ions which are mobile and free to move in the medium. Fused salt mixtures containing, for example, sodium chloride, calcium chloride, calcium fluoride, magnesium chloride, lithium chloride, potassium chloride, lithium bromide and potassium bromide can be used. These salts are particularly desirable from the standpoint of their low original cost. However, other economic factors, such as the operating temperature (size and cost of insulation packing for a reasonable heating cost), corrosiveness of the electrolyte or electro-decomposition products on the cell components and purification of the electrolyte must be considered. The lower melting point electrolytes are desirable. However, it is contemplated by the present invention that the electrolyte be operable at temperatures up to about 600° C.

Typical examples of materials which can be used as electrolytes include salts of metals. Specific examples of useful binary salt electrolytes are lithium chloride-potassium chloride, potassium chloride-magnesium chloride, magnesium chloride-sodium chloride, lithium bromide-potassium bromide, lithium fluoride-rubidium fluoride, magnesium chloride-rubidium chloride, lithium chloride-lithium fluoride, lithium chloride-strontium chloride, cesium chloride-sodium chloride, calcium chloride, lithium chloride, lithium sulfate-potassium chloride and mixtures thereof.

Examples of ternary salt electrolytes are calcium chloride-lithium chloride-potassium chloride, lithium chloride-potassium chloride-sodium chloride, calcium chloride-lithium chloride-sodium chloride, and lithium bromide-sodium bromide-lithium chloride.

Especially preferred systems, used with the aluminum-lithium electrode are those of potassium chloride-lithium chloride and lithium bromide and potassium bromide, and mixtures thereof.

A lithium chloride-potassium chloride system of 41 mole percent potassium chloride and 59 mole percent lithium chloride forms a eutectic which melts a 352° C. The potassium chloride-lithium chloride eutectic has a decomposition voltage of about 3.55 volts.

Referring more particularly to the drawing, a schematic test cell 10 of the present invention is shown. Tungsten oxide-containing composite electrode 12 and opposed aluminum-lithium electrode 11 are positioned one from another, in spaced relationship, immersed in an electrolyte 17 held in a heat resistant glass tube 16. Tungsten oxide-containing composite electrode 12 is fixed rigidly to a graphite current carrier 13 and aluminum-lithium electrode 11 is fixed rigidly to a steel current carrier 14. The container holding the electrolyte and electrodes is purged of atmospheric air and an inert gas introduced into the container. The open end of the container is then sealed with a cap 15, of inert material, such as lava or ceramic.

In operation potassium chloride crystals and lithium chloride crystals were mixed in a proportion of 59 mole percent lithium chloride and 41 mole percent potassium chloride and dried at about 500° C. for two hours and introduced to an electric storage cell container as illustrated in the drawing, containing a tungsten oxide-containing composite cathode and an opposed negative, aluminum-lithium alloy electrode of 18 weight percent lithium to a level about ½ inch above the electrodes. The two electrodes were connected through an external circuit. The electric storage cell was placed in an electric furnace at 500° C.

The cell was preconditioned in the furnace by charging the cell to 3.30 volts, open circuit, and discharging to about 0.7 volts, open circuit, and back to 3.30 volts open circuit. Additional cycling in this manner may be necessary, until constant discharge is obtained. Chemical pre-conditioning methods external to the cell may also be used.

It has been found that an energy storage cell so prepared has demonstrated energy storage at least about 3 times as great as presently known energy storage cells.

The device of the present invention operates more efficiently in a pressure range of about 1 p.s.i.g. to 1000 p.s.i.g. under an atmosphere of inert gas (e.g He, A, Kr) and at a temperature of from about 350° C. to about 500° C. It has been found that pressure has an effect on the oxidation conditions of the tungsten oxide and that pressure retards the degradation of the tungsten oxide-containing composite electrode.

Since the electric energy storage device, operates at or above the fusion temperature of the electrolyte, the above-mentioned electrolytes are provided a means of heating to insure their remaining in the molten state.

The electric energy storage units herein described lend themselves to connection with units of similar construction either by connection of a number of units in series and parallel or by utilization of a stack of electrodes.

The embodiments of the invention in which an exclusive property or privilege is claimed are defined as follows:

What is claimed is:

1. An electrical energy storage device operable above the melting point of the electrolyte, comprising in combination:
   (a) a fused salt electrolyte comprising an alkali metal halide salt or salts, an alkaline earth metal halide salt or salts, or a mixture of said salts;
   (b) a pair of spaced electrodes immersed in said electrolyte, at least one of the electrodes comprising tungsten oxide.

2. An electrical energy storage device in accordance with claim 1 wherein the electrode comprising tungsten oxide is a porous tungsten oxide electrode formed from particulate tungsten oxide.

3. An electrical energy storage device in accordance with claim 1 wherein the tungsten oxide electrode comprises from about 5.0% to in excess of 98 percent by weight of tungsten oxide, the balance being selected from carbon, graphite, boron carbide, silicon carbide, tungsten carbide, petroleum coke, conductive carbides, silicides, nitrides, and oxides of metals, stable in the environment of the electrolyte, or a binder selected from carbonized phenolic resin and carbonized coal tar pitch.

4. An electrical energy storage device in accordance with claim 1 wherein the positive electrode comprises from about 5.0 to in excess of 98 weight percent tungsten oxide, the balance being a conductive material or an inert binder, the opposed electrode being of an aluminum-lithium alloy composition and the electrolyte comprises lithium halide.

5. An electrical energy storage device in accordance with claim 3 wherein said tungsten oxide electrode is the positive electrode, and the opposed electrode comprises carbon.

6. A method for storing electrical energy comprising the steps of:
   (a) providing a fused salt electrolyte comprising an alkali metal halide salt or salts, an alkaline earth metal halide salt or salts, or a mixture of said salts;
   (b) heating the electrolyte, solid at ordinary temperatures, to above its melting point;
   (c) immersing a positive electrode comprising tungsten oxide in the electrolyte;
   (d) immersing a negative electrode selected from carbon, nickel, zinc, aluminum, magnesium, lithium, combinations thereof, and aluminum-lithium alloy in the electrolyte, said electrodes and electrolyte forming an electric energy storage device;
   (e) pre-conditioning the electrodes;
   (f) charging the cell electrically, the steps of immersing, pre-conditioning and charging being performed while the electrolyte is at a temperature at, or above its fusion point.

References Cited

UNITED STATES PATENTS

| | | | |
|---|---|---|---|
| 2,709,154 | 5/1955 | Hansgirg | 204—39 |
| 2,863,933 | 12/1958 | Minnick et al. | 136—6 |
| 2,946,836 | 7/1960 | Justi et al. | 136—120 |
| 2,992,143 | 7/1961 | Clifford et al. | 136—120 |
| 3,043,896 | 7/1962 | Herbert et al. | 136—154 |
| 3,160,531 | 12/1964 | Spindler | 136—120 |

WINSTON A. DOUGLAS, *Primary Examiner.*

C. F. LeFEVOUR, *Assistant Examiner.*